United States Patent
Figueroa

[19]

[11] Patent Number: 6,089,143
[45] Date of Patent: Jul. 18, 2000

[54] MASHED POTATO MACHINE

[76] Inventor: Carmina B. Figueroa, 30W026 Laurel Ct., Warrenville, Ill. 60555

[21] Appl. No.: 09/442,996

[22] Filed: Nov. 18, 1999

[51] Int. Cl.[7] .......................... A47J 27/00; A47J 43/044; B01F 7/20; B01F 7/24; B01F 7/32
[52] U.S. Cl. .................. 99/327; 99/332; 99/348; 366/145; 366/146; 366/199; 366/206; 366/297
[58] Field of Search ............ 99/326–333, 337–340, 99/348, 468; 366/144–149, 292, 297–301, 197–200, 206; 241/101.1

[56] References Cited

U.S. PATENT DOCUMENTS

| | | | |
|---|---|---|---|
| 3,638,557 | 2/1972 | Ljung | 99/348 |
| 3,814,360 | 6/1974 | Samuelian, Sr. et al. | 366/200 X |
| 3,891,171 | 6/1975 | Samuelian et al. | 248/131 |
| 3,924,838 | 12/1975 | Waniishi et al. | 259/108 |
| 4,026,532 | 5/1977 | Madan | 366/207 |
| 4,131,034 | 12/1978 | Rolf | 366/288 |
| 4,151,792 | 5/1979 | Nearhood | 99/348 |
| 4,422,343 | 12/1983 | Falkenbach et al. | 241/101.1 |
| 4,591,273 | 5/1986 | Meyer et al. | 366/331 |
| 4,645,352 | 2/1987 | Valbona et al. | 366/343 |
| 4,693,610 | 9/1987 | Weiss | 99/348 |
| 4,714,205 | 12/1987 | Steinko | 241/95 |
| 4,936,688 | 6/1990 | Cornell | 99/348 |
| 5,332,310 | 7/1994 | Wells | 366/344 |
| 5,498,074 | 3/1996 | Moller et al. | 366/224 |
| 5,524,530 | 6/1996 | Nijzingh et al. | 99/348 |
| 5,533,805 | 7/1996 | Mandel | 366/197 X |
| 5,711,602 | 1/1998 | Rohring et al. | 366/251 |
| 5,816,136 | 10/1998 | Stallings | 99/335 |

*Primary Examiner*—Timothy Simone
*Attorney, Agent, or Firm*—Joseph N. Breaux

[57] ABSTRACT

A machine that is set up with the required potatoes, milk, butter and other seasonings for mashed potatoes and that when turned on proceeds to boil the potatoes, add the flavoring ingredients and whip the potatoes to a degree set by the user.

1 Claim, 2 Drawing Sheets

MASHED POTATO MACHINE

TECHNICAL FIELD

The present invention relates to cooking accessories and more particularly to a mashed potato machine that includes a bottom cooker assembly, a drained water receiving container, a cooking container, a combination lid/mixer assembly, and a dual plug power cord; the bottom cooker assembly including a cooker housing having a heater element provided on the interior sidewall of a container receiving cavity formed therein, a timer unit in connection with the heater element, a drain solenoid valve connecting socket and a bottom power connecting socket, a pair of lifting handles, a pair of lid latching protrusions, and a number of suction cup feet; the drained water receiving container being sized to fit entirely within a bottom portion of the container receiving cavity of the cooker housing and having a drained water receiving cavity in connection with a drain valve connecting fitting formed through a sidewall thereof; the cooking container being sized to fit entirely within a top portion of the container receiving cavity of the cooker housing when seated on top of the drained water receiving container and having a cooking cavity formed therein in connection with a solenoid controlled valve assembly including a first conduit in connection with the cooking cavity and a second conduit terminating in an attachment fitting mateable with the connecting fitting of the drained water receiving container; the solenoid controlled valve assembly including a control line plug insertable into connection with the drain solenoid valve connecting socket of the timer unit; the combination lid/mixer assembly including a lid portion sized to sealing cover a top opening of the container receiving cavity, a pair of latch assemblies positioned to engage the pair of lid latching protrusions to secure the lid portion in sealing relationship with the bottom cooker assembly, a lid power cord connecting socket, a pair of ingredient dispensing chambers positioned atop the lid portion each in connection with a dispensing orifice sealed by a dispensing solenoid valve controlled by the timer unit to dispense the contents of the ingredient dispensing chamber as needed, a steam vent through the lid portion, a viewing window for viewing the cooking container, and a mixer assembly controlled by the timer unit and including a pair of detachable beater members; the beater members extending into the cooking cavity when the lid portion is secured to the bottom cooker assembly and being moveable throughout the cooking cavity when in operation by a gear mechanism; the dual plug power cord including a wall outlet plug, a bottom connecting plug and a lid connecting plug; the timer unit controlling the operating sequence of the heater element, the solenoid controlled valve assembly, the dispensing solenoid valve, and the mixer assembly.

BACKGROUND ART

Real mashed potatoes are enjoyed by many people who do not like to spend the time or energy necessary to prepare the mashed potatoes from scratch. It would be a benefit to these individuals to have a machine that could be set up with the required potatoes, milk, butter and other seasonings and that would then proceed to boil the potatoes, add the flavoring ingredients and whip the potatoes to a degree set by the user.

GENERAL SUMMARY DISCUSSION OF INVENTION

It is thus an object of the invention to provide a mashed potato machine that includes a bottom cooker assembly, a drained water receiving container, a cooking container, a combination lid/mixer assembly, and a dual plug power cord; the bottom cooker assembly including a cooker housing having a heater element provided on the interior sidewall of a container receiving cavity formed therein, a timer unit in connection with the heater element, a drain solenoid valve connecting socket and a bottom power connecting socket, a pair of lifting handles, a pair of lid latching protrusions, and a number of suction cup feet; the drained water receiving container being sized to fit entirely within a bottom portion of the container receiving cavity of the cooker housing and having a drained water receiving cavity in connection with a drain valve connecting fitting formed through a sidewall thereof; the cooking container being sized to fit entirely within a top portion of the container receiving cavity of the cooker housing when seated on top of the drained water receiving container and having a cooking cavity formed therein in connection with a solenoid controlled valve assembly including a first conduit in connection with the cooking cavity and a second conduit terminating in an attachment fitting mateable with the connecting fitting of the drained water receiving container; the solenoid controlled valve assembly including a control line plug insertable into connection with the drain solenoid valve connecting socket of the timer unit; the combination lid/mixer assembly including a lid portion sized to sealing cover a top opening of the container receiving cavity, a pair of latch assemblies positioned to engage the pair of lid latching protrusions to secure the lid portion in sealing relationship with the bottom cooker assembly, a lid power cord connecting socket, a pair of ingredient dispensing chambers positioned atop the lid portion each in connection with a dispensing orifice sealed by a dispensing solenoid valve controlled by the timer unit to dispense the contents of the ingredient dispensing chamber as needed, a steam vent through the lid portion, a viewing window for viewing the cooking container, and a mixer assembly controlled by the timer unit and including a pair of detachable beater members; the beater members extending into the cooking cavity when the lid portion is secured to the bottom cooker assembly and being moveable throughout the cooking cavity when in operation by a gear mechanism; the dual plug power cord including a wall outlet plug, a bottom connecting plug and a lid connecting plug; the timer unit controlling the operating sequence of the heater element, the solenoid controlled valve assembly, the dispensing solenoid valve, and the mixer assembly.

Accordingly, a mashed potato machine is provided. The mashed potato machine includes a bottom cooker assembly, a drained water receiving container, a cooking container, a combination lid/mixer assembly, and a dual plug power cord; the bottom cooker assembly including a cooker housing having a heater element provided on the interior sidewall of a container receiving cavity formed therein, a timer unit in connection with the heater element, a drain solenoid valve connecting socket and a bottom power connecting socket, a pair of lifting handles, a pair of lid latching protrusions, and a number of suction cup feet; the drained water receiving container being sized to fit entirely within a bottom portion of the container receiving cavity of the cooker housing and having a drained water receiving cavity in connection with a drain valve connecting fitting formed through a sidewall thereof; the cooking container being sized to fit entirely within a top portion of the container receiving cavity of the cooker housing when seated on top of the drained water receiving container and having a cooking cavity formed therein in connection with a solenoid controlled valve assembly including a first conduit in connection with the cooking cavity and a second conduit terminating in an attachment fitting mateable with the connecting fitting of the drained water receiving container; the solenoid controlled valve assembly including a control line plug insertable into connection with the drain solenoid valve connecting socket of the timer unit; the combination lid/mixer assembly including a lid portion sized to sealing cover a top opening of the container receiving cavity, a pair of latch assemblies positioned to engage the pair of lid latching protrusions to secure the lid portion in sealing relationship with the bottom cooker assembly, a lid power cord connecting socket, a pair of ingredient dispensing chambers positioned atop the lid portion each in connection with a dispensing orifice sealed by a dispensing solenoid valve controlled by the timer unit to dispense the contents of the ingredient dispensing chamber as needed, a steam vent through the lid portion, a viewing window for viewing the cooking container, and a mixer assembly controlled by the timer unit and including a pair of detachable beater members; the beater members extending into the cooking cavity when the lid portion is secured to the bottom cooker assembly and being moveable throughout the cooking cavity when in operation by a gear mechanism; the dual plug power cord including a wall outlet plug, a bottom connecting plug and a lid connecting plug; the timer unit controlling the operating sequence of the heater element, the solenoid controlled valve assembly, the dispensing solenoid valve, and the mixer assembly.

BRIEF DESCRIPTION OF DRAWINGS

For a further understanding of the nature and objects of the present invention, reference should be made to the following detailed description, taken in conjunction with the accompanying drawings, in which like elements are given the same or analogous reference numbers and wherein.

EXEMPLARY MODE FOR CARRYING OUT THE INVENTION

Figure 1:
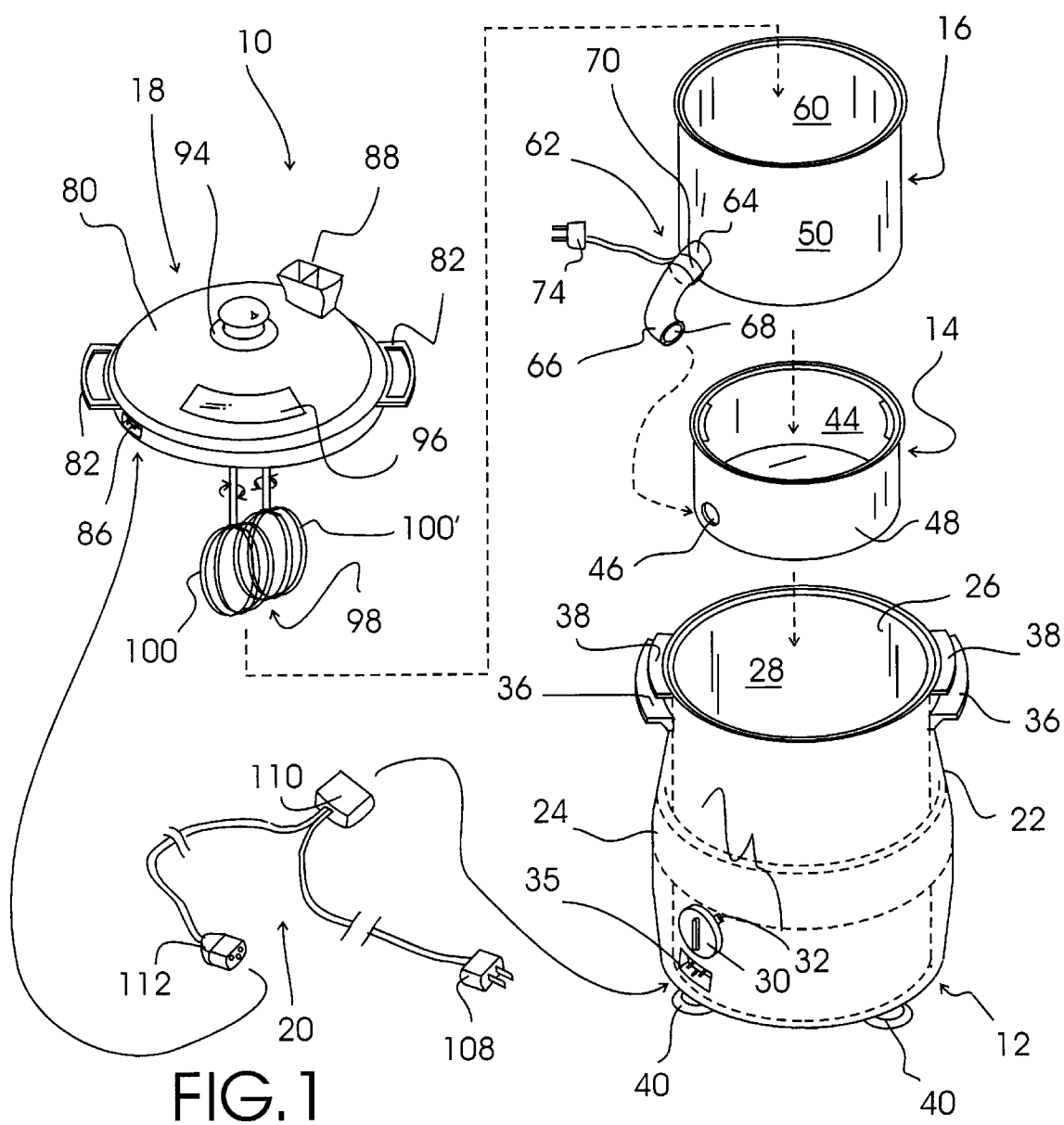
FIG. 1 is an exploded perspective view of an exemplary embodiment of the mashed potato machine of the present invention.
Figure 2:
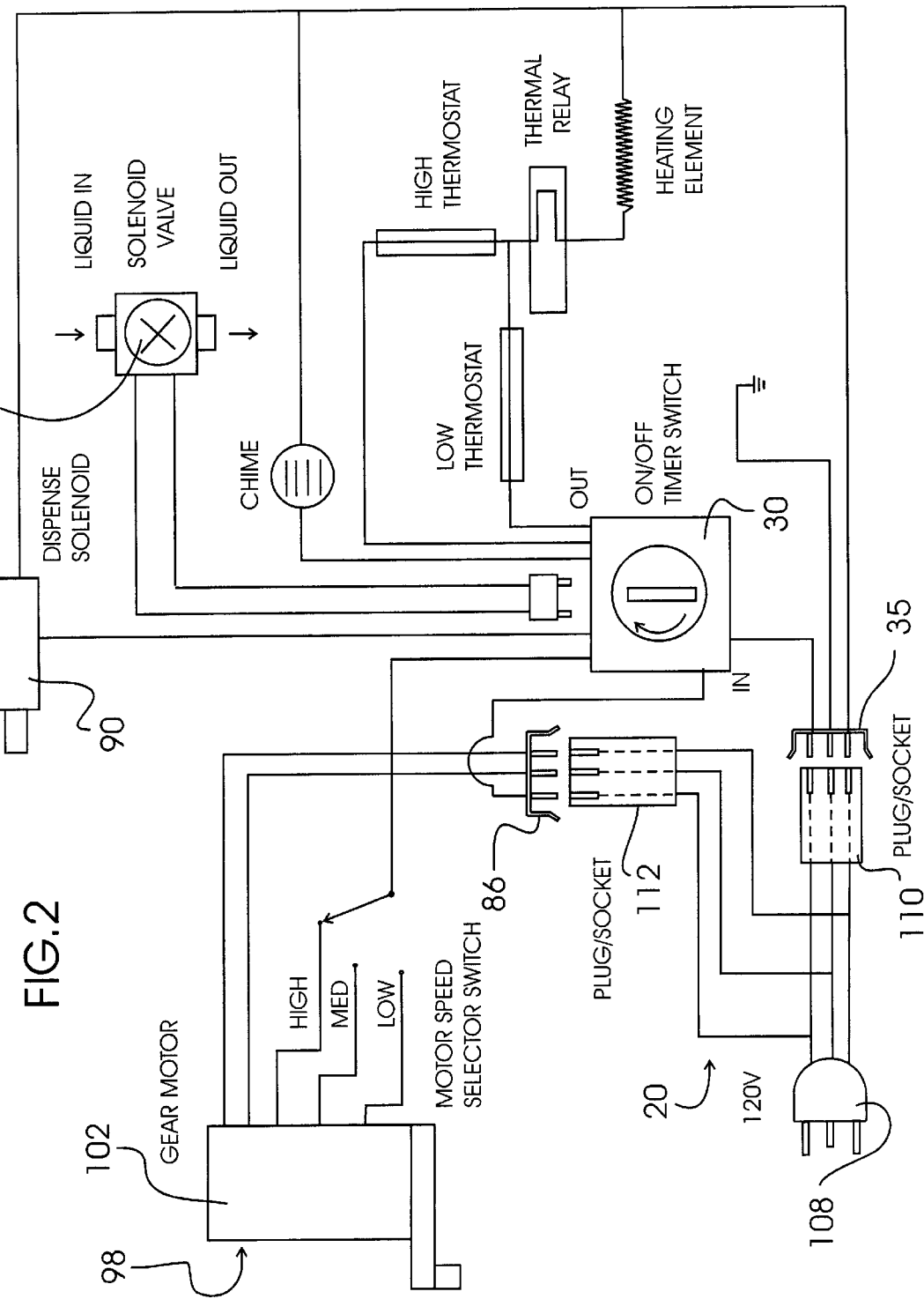
FIG. 2 is a schematic diagram of the electrical elements of the mashed potato machine of FIG. 1.

With general reference to FIGS. 1 and 2, mashed potato machine 10 includes a bottom cooker assembly, generally designated 12; a drained water receiving container, generally designated 14; a cooking container, generally designated 16; a combination lid/mixer assembly, generally designated 18; and a dual plug power cord, generally designated 20.

Bottom cooker assembly 12 including a cooker housing 22 having a heater element 24 (shown in dashed lines) provided on the interior sidewall 26 of a container receiving cavity 28 formed therein, a power connecting socket 35, a timer unit 30 in connection with heater element 24 having a drain solenoid valve connecting socket 32 and a bottom power connecting socket 34, a pair of lifting handles 36, a pair of lid latching protrusions 38, and a number of suction cup feet 40.

Drained water receiving container 14 is of metal construction and is sized to fit entirely within a bottom portion of container receiving cavity 28 of cooker housing 22 below heating element 24 and has a drained water receiving cavity 44 formed therein in connection with a drain valve connecting fitting 46 formed through a sidewall 48 thereof. Cooking container 16 is sized to fit entirely within a top portion of the container receiving cavity 28 such that the cooking container sidewalls 50 contact heating element 24 of cooker housing 12 when cooking container 16 is seated on top of drained water receiving container 14. Cooking container 16 has a cooking cavity 60 formed therein in connection with a solenoid controlled valve assembly, generally designated 62, including a first conduit 64 in connection with cooking cavity 60 and a second conduit 66 terminating in an attachment fitting 68 mateable with connecting fitting 46 of drained water receiving container 14. A solenoid controlled valve assembly 70 is provided between first and second conduits 64,66 and has a control line plug 74 insertable into connection with drain solenoid valve connecting socket 32 of timer unit 30.

Combination lid/mixer assembly 18 includes a lid portion 80 sized to sealing cover a top opening of container receiving cavity 28, a pair of latch assemblies 82 positioned to engage the pair of lid latching protrusions 38 to secure lid portion 80 in sealing, non-rotating relationship with bottom cooker assembly 22, a lid power cord connecting socket 86, a pair of ingredient dispensing chambers 88 positioned atop lid portion 80 each in connection with a dispensing orifice sealed by a dispensing solenoid valve 90 FIG. 2) controlled by timer unit 30 to dispense the contents of the ingredient dispensing chambers 88 as needed, a steam vent 94 through the lid portion 80, a viewing window 96 for viewing the cooking container 16, and a mixer assembly 98 controlled by timer unit 30 and including a pair of detachable beater members 100.

In use, beater members 100 extend into the cooking cavity 60 when lid portion 80 is secured to bottom cooker assembly 22 and are moveable throughout the cooking cavity 60 when a mixer gear motor 106 (FIG. 2) is in operation. Dual plug power cord 20 including a wall outlet plug 108, a bottom connecting plug 110 and a lid connecting plug 112. Timer unit 30 controls the operating sequence of heater element 24, solenoid controlled valve assembly 70, dispensing solenoid valve 90, and mixer assembly 98 to produce mashed potatoes once the mashed potato machine is initially set up.

It can be seen from the preceding description that a mashed potato machine has been provided that includes a bottom cooker assembly, a drained water receiving container, a cooking container, a combination lid/mixer assembly, and a dual plug power cord; the bottom cooker assembly including a cooker housing having a heater element provided on the interior sidewall of a container receiving cavity formed therein, a timer unit in connection with the heater element, a drain solenoid valve connecting socket and a bottom power connecting socket, a pair of lifting handles, a pair of lid latching protrusions, and a number of suction cup feet; the drained water receiving container being sized to fit entirely within a bottom portion of the container receiving cavity of the cooker housing and having a drained water receiving cavity in connection with a drain valve connecting fitting formed through a sidewall thereof; the cooking container being sized to fit entirely within a top portion of the container receiving cavity of the cooker housing when seated on top of the drained water receiving container and having a cooking cavity formed therein in connection with a solenoid controlled valve assembly including a first conduit in connection with the cooking cavity and a second conduit terminating in an attachment fitting mateable with the connecting fitting of the drained water receiving container; the solenoid controlled valve assembly including a control line plug insertable into connection with the drain solenoid valve connecting socket of the timer unit; the combination lid/mixer assembly including a lid portion sized to sealing cover a top opening of the container receiving cavity, a pair of latch assemblies positioned to engage the pair of lid latching protrusions to secure the lid portion in sealing relationship with the bottom cooker assembly, a lid power cord connecting socket, a pair of ingredient dispensing chambers positioned atop the lid portion each in connection with a dispensing orifice sealed by a dispensing solenoid valve controlled by the timer unit to dispense the contents of the ingredient dispensing chamber as needed, a steam vent through the lid portion, a viewing window for viewing the cooking container, and a mixer assembly controlled by the timer unit and including a pair of detachable beater members; the beater members extending into the cooking cavity when the lid portion is secured to the bottom cooker assembly and being moveable throughout the cooking cavity when in operation by a gear mechanism; the dual plug power cord including a wall outlet plug, a bottom connecting plug and a lid connecting plug; the timer unit controlling the operating sequence of the heater element, the solenoid controlled valve assembly, the dispensing solenoid valve, and the mixer assembly.

It is noted that the embodiment of the mashed potato machine described herein in detail for exemplary purposes is of course subject to many different variations in structure, design, application and methodology. Because many varying and different embodiments may be made within the scope of the inventive concept(s) herein taught, and because many modifications may be made in the embodiment herein detailed in accordance with the descriptive requirements of the law, it is to be understood that the details herein are to be interpreted as illustrative and not in a limiting sense.

What is claimed is:

1. A mashed potato machine comprising:

a bottom cooker assembly;

a drained water receiving container;

a cooking container;

a combination lid/mixer assembly; and a dual plug power cord;

said bottom cooker assembly including a cooker housing having a heater element provided on said interior sidewall of a container receiving cavity formed therein, a timer unit in connection with said heater element, a drain solenoid valve connecting socket, a bottom power connecting socket, a pair of lifting handles, and a pair of lid latching protrusions;

said drained water receiving container being sized to fit entirely within a bottom portion of said container receiving cavity of said cooker housing and having a drained water receiving cavity in connection with a drain valve connecting fitting formed through a sidewall thereof;

said cooking container being sized to fit entirely within a top portion of said container receiving cavity of said cooker housing when seated on top of said drained water receiving container and having a cooking cavity formed therein in connection with a solenoid controlled valve assembly including a first conduit in connection with said cooking cavity and a second conduit terminating in an attachment fitting mateable with said connecting fitting of said drained water receiving container;

said solenoid controlled valve assembly including a control line plug insertable into connection with said drain solenoid valve connecting socket of said timer unit;

said combination lid/mixer assembly including a lid portion sized to sealing cover a top opening of said container receiving cavity, a pair of latch assemblies positioned to engage said pair of lid latching protrusions to secure said lid portion in sealing relationship with said bottom cooker assembly, a lid power cord connecting socket, a pair of ingredient dispensing chambers positioned atop said lid portion each in connection with a dispensing orifice sealed by a dispensing solenoid valve controlled by said timer unit to dispense said contents of said ingredient dispensing chamber as needed, a steam vent through said lid portion, a viewing window for viewing said cooking container, and a mixer assembly controlled by said timer unit and including a pair of detachable beater members;

said beater members extending into said cooking cavity when said lid portion is secured to said bottom cooker assembly and being moveable throughout said cooking cavity when in operation by a gear mechanism;

said dual plug power cord including a wall outlet plug, a bottom connecting plug and a lid connecting plug;

said timer unit controlling said operating sequence of said heater element, said solenoid controlled valve assembly, said dispensing solenoid valve, and said mixer assembly.

* * * * *